(12) United States Patent
Lee

(10) Patent No.: US 7,988,174 B2
(45) Date of Patent: Aug. 2, 2011

(54) ELECTRICALLY-EXTENDIBLE BICYCLE

(76) Inventor: Yueh-Tao Lee, Kaohsiung (TW)

( * ) Notice: Subject to any disclaimer, the term of this patent is extended or adjusted under 35 U.S.C. 154(b) by 153 days.

(21) Appl. No.: 12/553,995

(22) Filed: Sep. 4, 2009

(65) Prior Publication Data

US 2011/0057413 A1   Mar. 10, 2011

(51) Int. Cl.
*B62M 1/16* (2006.01)
(52) U.S. Cl. ........................................ 280/278; 280/287
(58) Field of Classification Search ............... 280/278, 280/287
See application file for complete search history.

(56) References Cited

U.S. PATENT DOCUMENTS

| | | | | |
|---|---|---|---|---|
| 4,647,060 A | * | 3/1987 | Tomkinson | 280/288.1 |
| 6,354,618 B1 | * | 3/2002 | Liao | 280/287 |
| 6,712,375 B2 | * | 3/2004 | Chao | 280/287 |
| 6,854,752 B2 | * | 2/2005 | Chao | 280/278 |
| 7,080,847 B2 | * | 7/2006 | Chao | 280/278 |
| 2008/0303243 A1 | * | 12/2008 | Ying | 280/287 |

* cited by examiner

*Primary Examiner* — Kevin Hurley
(74) *Attorney, Agent, or Firm* — Leong C. Lei

(57) ABSTRACT

An electrically-extendible bicycle includes two shaft tubes, which are arranged symmetrically on opposite sides of a head tube that is set atop a front fork. The two shaft tubes extend through a guide sleeve. The shaft tubes have bottom surfaces on which racks are respectively formed. A motor is set on a rear fork of the bicycle and is coupled to a transmission gear train, which mates the racks on the bottom surfaces of the shaft tubes. After the operation of the motor is activated, the transmission gear train selectively drives forward and backward movement of the shaft tubes so as to extend and retract the bicycle.

4 Claims, 10 Drawing Sheets

ELECTRICALLY-EXTENDIBLE BICYCLE

(a) TECHNICAL FIELD OF THE INVENTION

The present invention generally relates to an electrically-extendible bicycle, and more particularly to a structure that extends and/or retracts a bicycle through electrical power.

(b) DESCRIPTION OF THE PRIOR ART

With energy sources of the world being consuming up and getting expensive, power saving transportation is now getting popular. Bicycles, which are good for exercise and leisure, are one of the most popular transportation measures. A regular bicycle has a fixed length, which causes certain trouble in carrying the bicycle especially when the carrier is driving a car or takes a bus. A foldable bicycle is also available in the market. The foldable bicycle allows for collapse to a very compact form for carrying in subways or storage in a back trunk and also allows for easy resumption of the original structure for riding. Although the foldable bicycle currently available is good for collapse, it needs quite a physical strength to carry out the collapse operation. This is apparently disadvantageous to women and children who are physically weak. Thus, it is desired to have a bicycle that has a structure allowing for easy and effort-saved reduction of overall size in order to facility carrying thereof.

SUMMARY OF THE INVENTION

The primary objective of the present invention is to provide an electrically-extendible bicycle that comprises a structure for extending and retracting the bicycle through electrical power so as to realize easy and simple operation of extension and retraction of the bicycle.

In accordance with an aspect of the present invention, an electrically-extendible bicycle comprises two shaft tubes, which are arranged symmetrically on opposite sides of a head tube that is set atop a front fork. The two shaft tubes extend through a guide sleeve and the shaft tubes have bottom surfaces on which racks are respectively formed. A motor is set on a rear fork of the bicycle and has a spindle coupled to a speed-change gear of a transmission gear train. Two pinions are respectively arranged on opposite sides of the speed-change gear and the two pinions on the two sides respectively mate the racks on the bottom surfaces of the two shaft tubes. The motor, when activated for forward and/or backward rotation, drives forward and/or backward movement of the shaft tubes through the transmission gear train so as to realize extension and/or retraction of the bicycle.

In accordance with another aspect of the present invention, an electrically-extendible bicycle comprises a shaft tube, which extends from one side of a head tube that is set atop a front fork. The shaft tube extends through a guide sleeve. The guide sleeve is arranged to abut against one side of a seat tube that is arranged below a seat. The shaft tube has a bottom surface on which a rack is formed. A motor is set on a rear fork of the bicycle and has a spindle coupled to a speed-reduction gear of a transmission gear train. A pinion is set at one side of the gear-reduction gear and the pinion mates the rack on the bottom surface of the shaft tube. The motor, when activated for forward and/or backward rotation, drives forward and/or backward movement of the shaft tube through the transmission gear train so as to realize extension and/or retraction of the bicycle.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
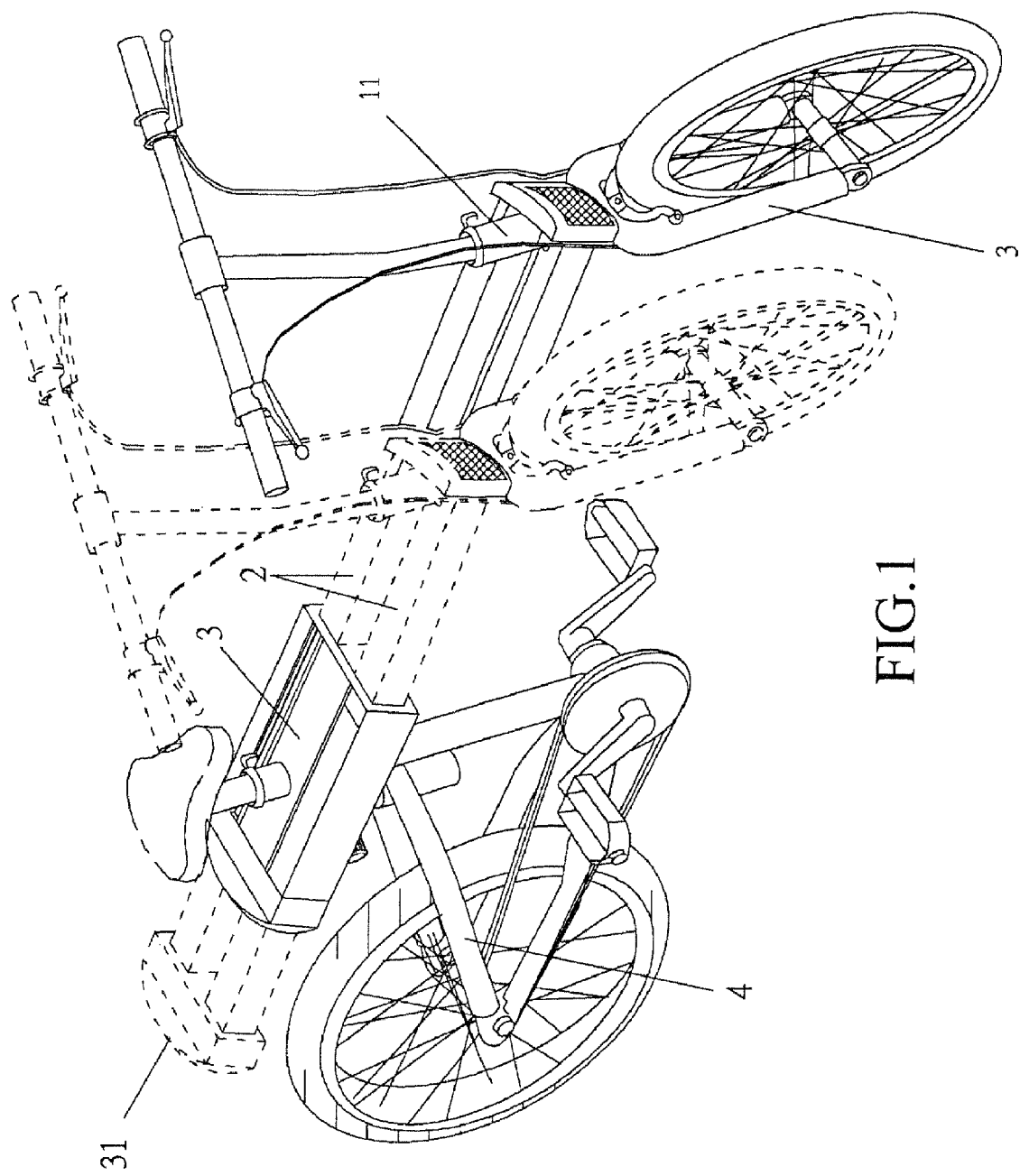
FIG. 1 is a perspective view showing a bicycle in accordance with an embodiment of the present invention.
Figure 2:
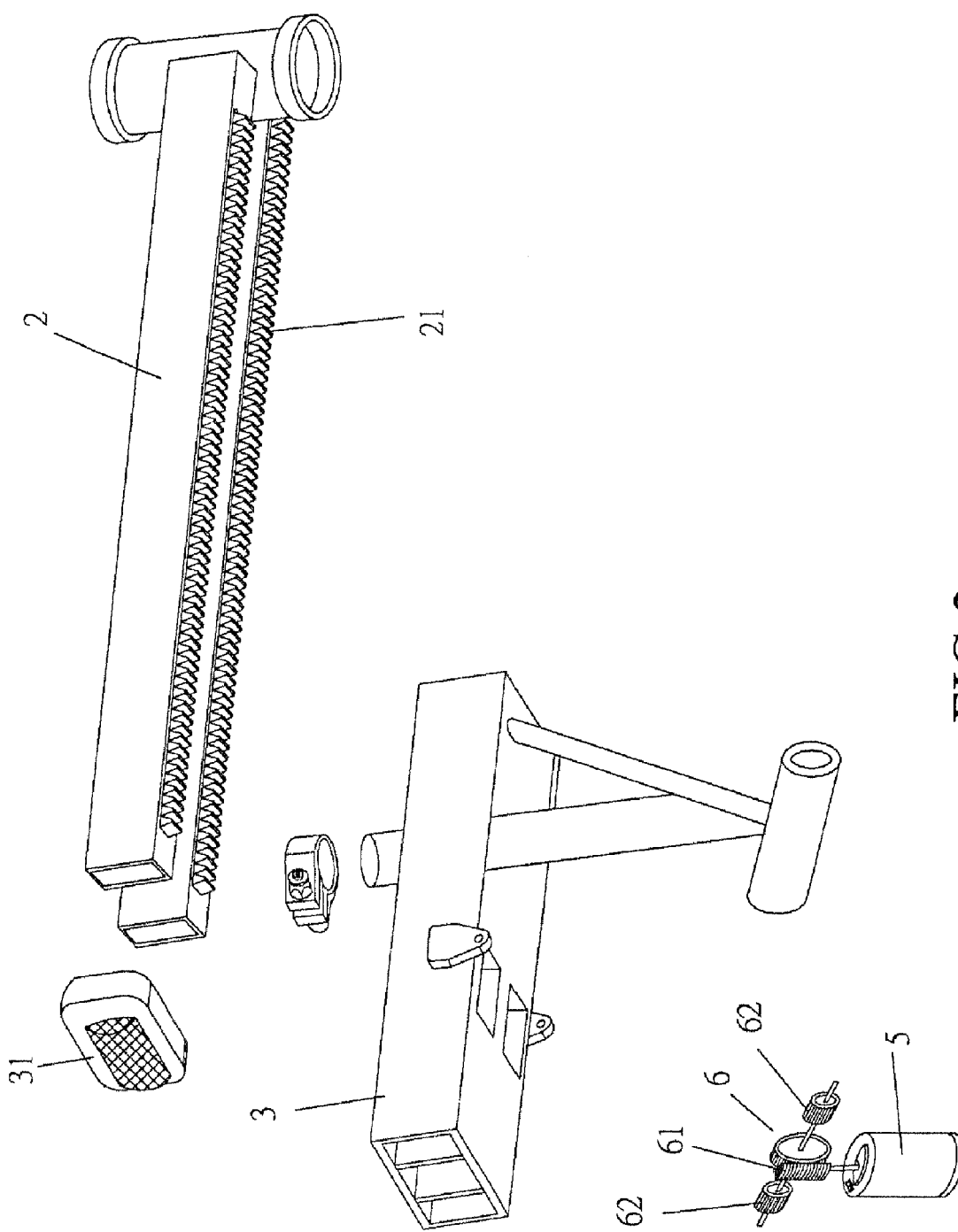
FIG. 2 is an exploded view of a portion of the embodiment of the present invention.
Figure 5:
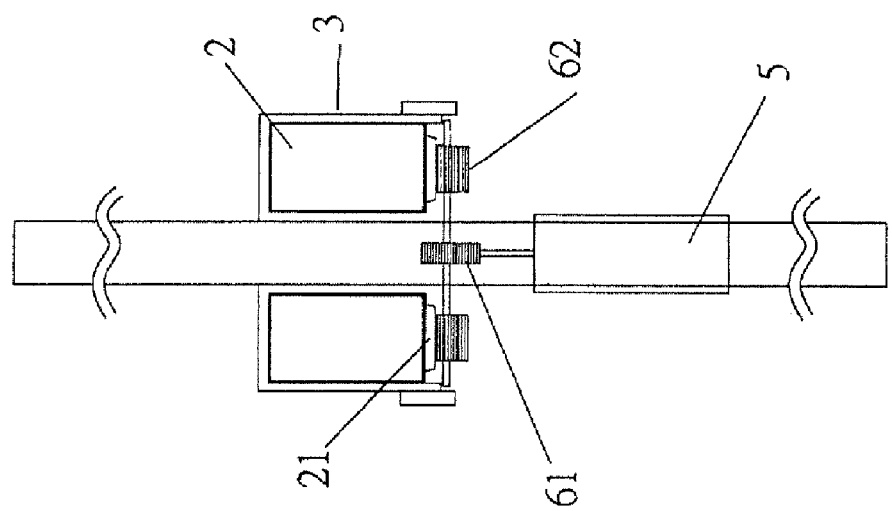
FIG. 5 is a cross-sectional view showing an alternative form of the shaft tubes in accordance with the present invention.
Figure 3:
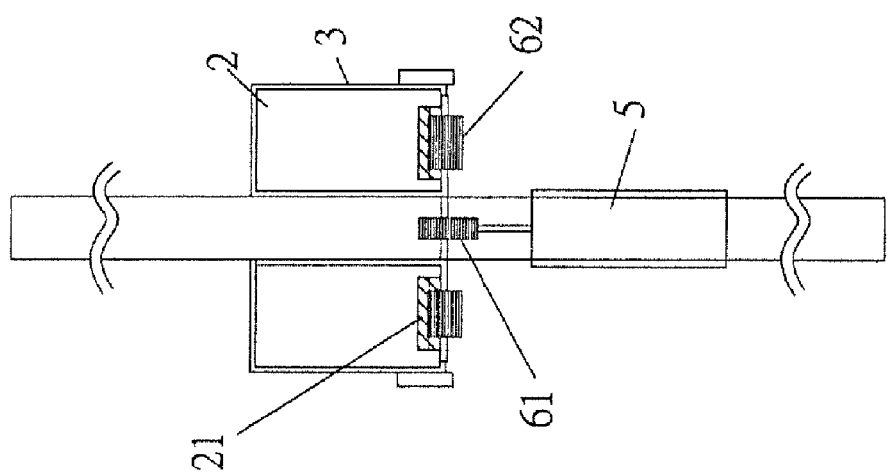
FIG. 3 is a cross-sectional view showing shaft tubes, a guide sleeve, and a driving element of the embodiment of the present invention.

As shown in FIGS. 1-3, the present invention provides an electrically-extendible bicycle, which comprises a front fork 1 atop which a head tube 11 is provided. Two shaft tubes 2 are arranged symmetrically on opposite sides of the head tube 11 and extend rearwards of the bicycle. The two shaft tubes 2 extend through a guide sleeve 3. A closure member 31 is mounted to rear ends of the two shaft tubes 2. Each shaft tube 2 has a bottom surface on which a rack 21 is formed. A motor 5 is set on a rear fork 4 of the bicycle. The motor 5 is connected by electrical wires to a battery (not shown in the drawings). The motor 5 has a spindle that is coupled to a speed-change gear 61 of a transmission gear train 6. Two pinions 62 are respectively arranged on opposite sides of the speed-change gear 61 and respectively mate the racks 21 mounted to the bottom surfaces of the two shaft tubes 2. The motor 3 is operative for forward and backward rotation.

It is not necessary for the racks 21 to be arranged on the bottoms of the shaft tubes 2 and, instead, the racks 21 can be set on tops or left and right sides of the shaft tubes 2 with the motor 5 and the transmission gear train 6 arranged at corresponding location. In this way, the motor 5 can still drive movement of the shaft tubes 2 through the transmission gear train 6.

Figure 4:
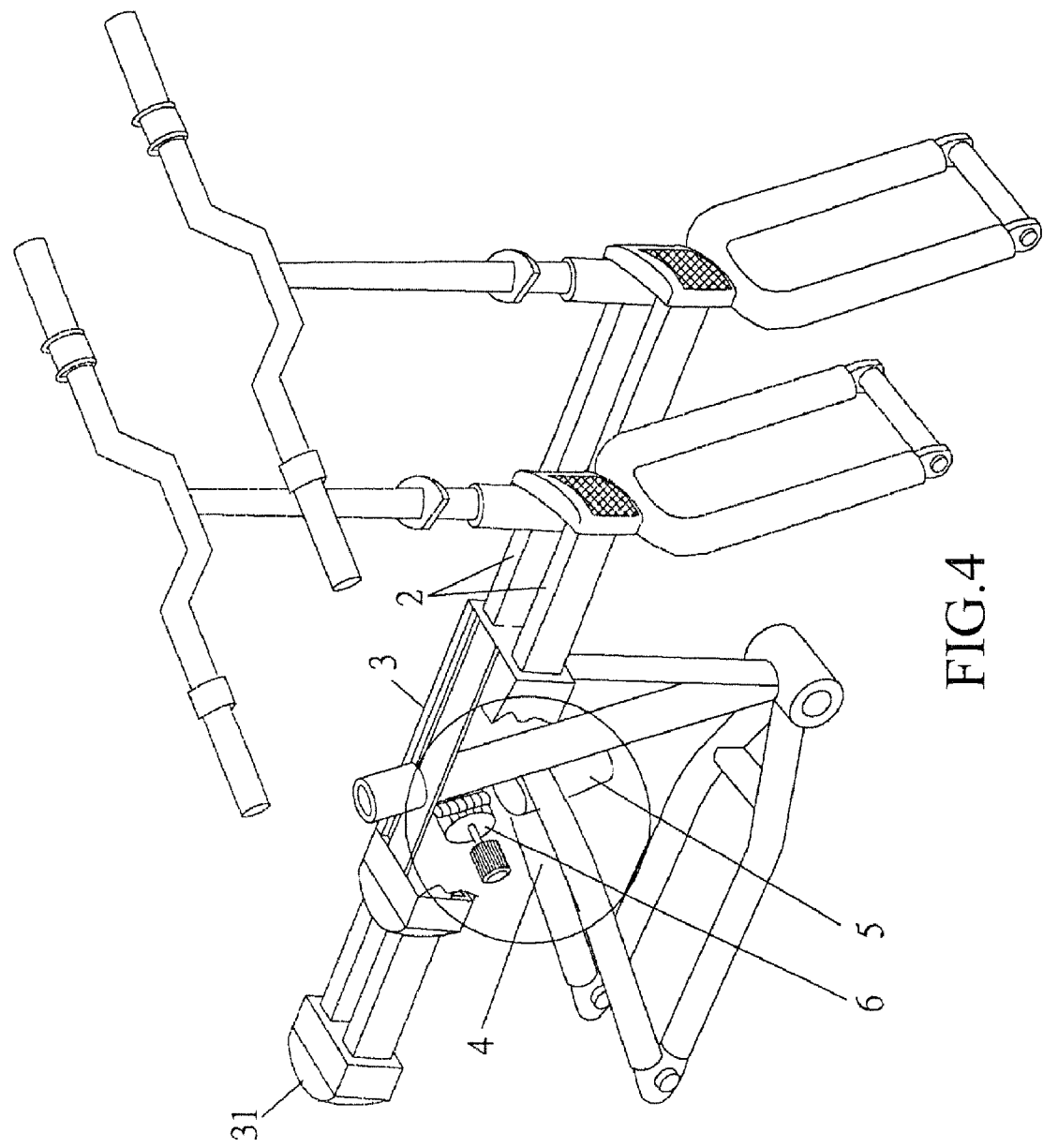
FIG. 4 is a perspective view showing the operation of the embodiment of the present invention.

When a user wishes to reduce the length of the bicycle, the user activates the operation of the motor 5. Due to the coupling between the spindle of the motor 5 and the speed-change gear 61 of the transmission gear train 6, the speed-change gear 61 is driven by the motor 5 and the pinions 62 are rotated. Since the pinions 62 mate the racks 21 on the bottom surfaces of the shaft tubes 2, the transmission gear train 6 may operate to cause backward movement of the shaft tubes 2 so as to retract the bicycle, as shown in FIG. 4, and thus reducing the length of the bicycle. To resume the original length, the operation of the motor 5 is activated again to cause rotation of the motor 5 in an opposite direction. The transmission gear train 6 then causes the shaft tubes 2 to move forward to resume to the original condition of the bicycle. The present invention uses electrical means to realize extension and retraction of the bicycle, which is done through pushing down a button to start operation of the motor 5. This is not only easy but also effort saving, so that it can be done easily by women and children having poor physical strength. Further, the turns of rotation of the motor 5 can be set in advance so that the motor 5 automatically stops when the turns of rotation are reached. This provides safety of operation and eliminates the concern about damage of the bicycle.

In an alternative arrangement, the rack 21 on the bottom of the shaft tube 2 can be arranged in a recessed configuration and this arrangement provides the shaft tube 2 with a flat bottom surface.

Figure 6:
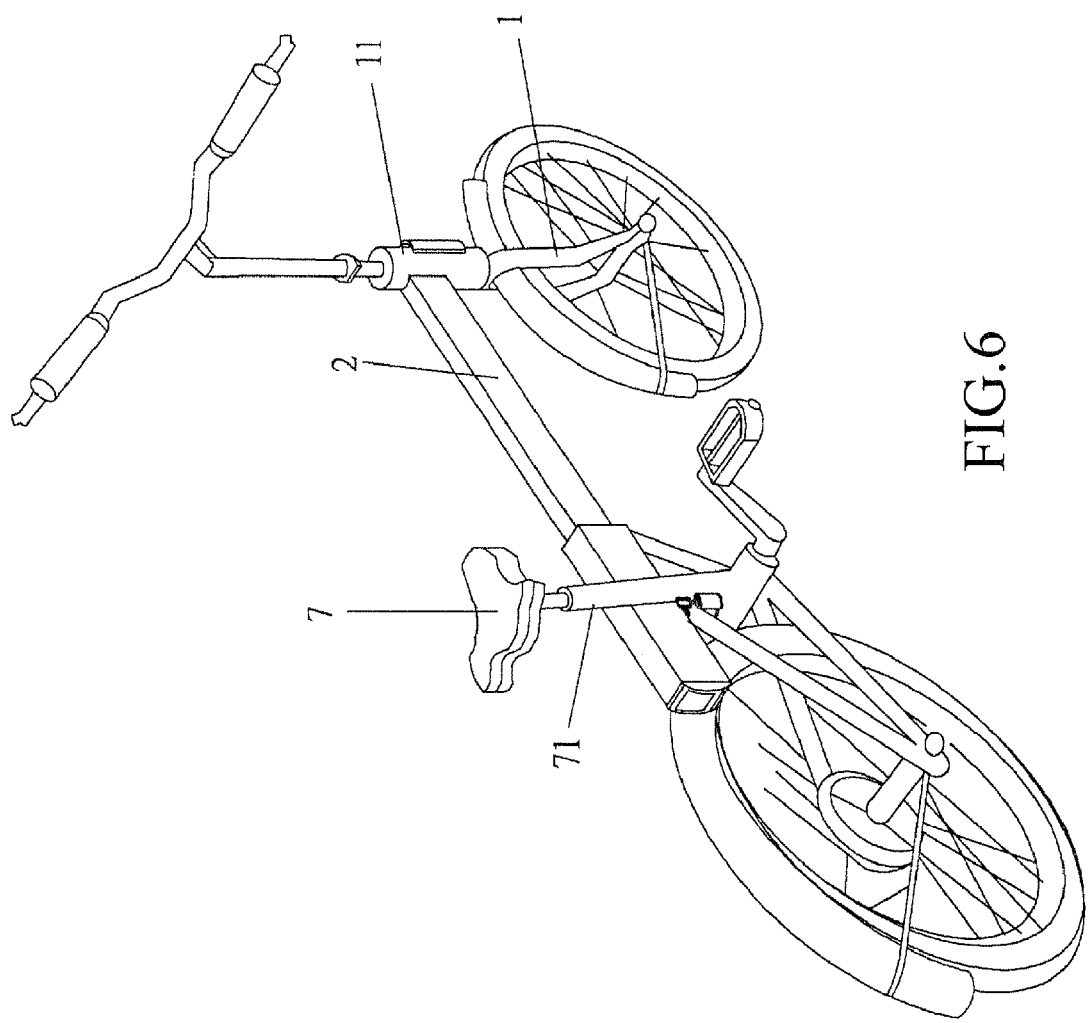
FIG. 6 is a perspective view showing a bicycle in accordance with another embodiment of the present invention.
Figure 7:
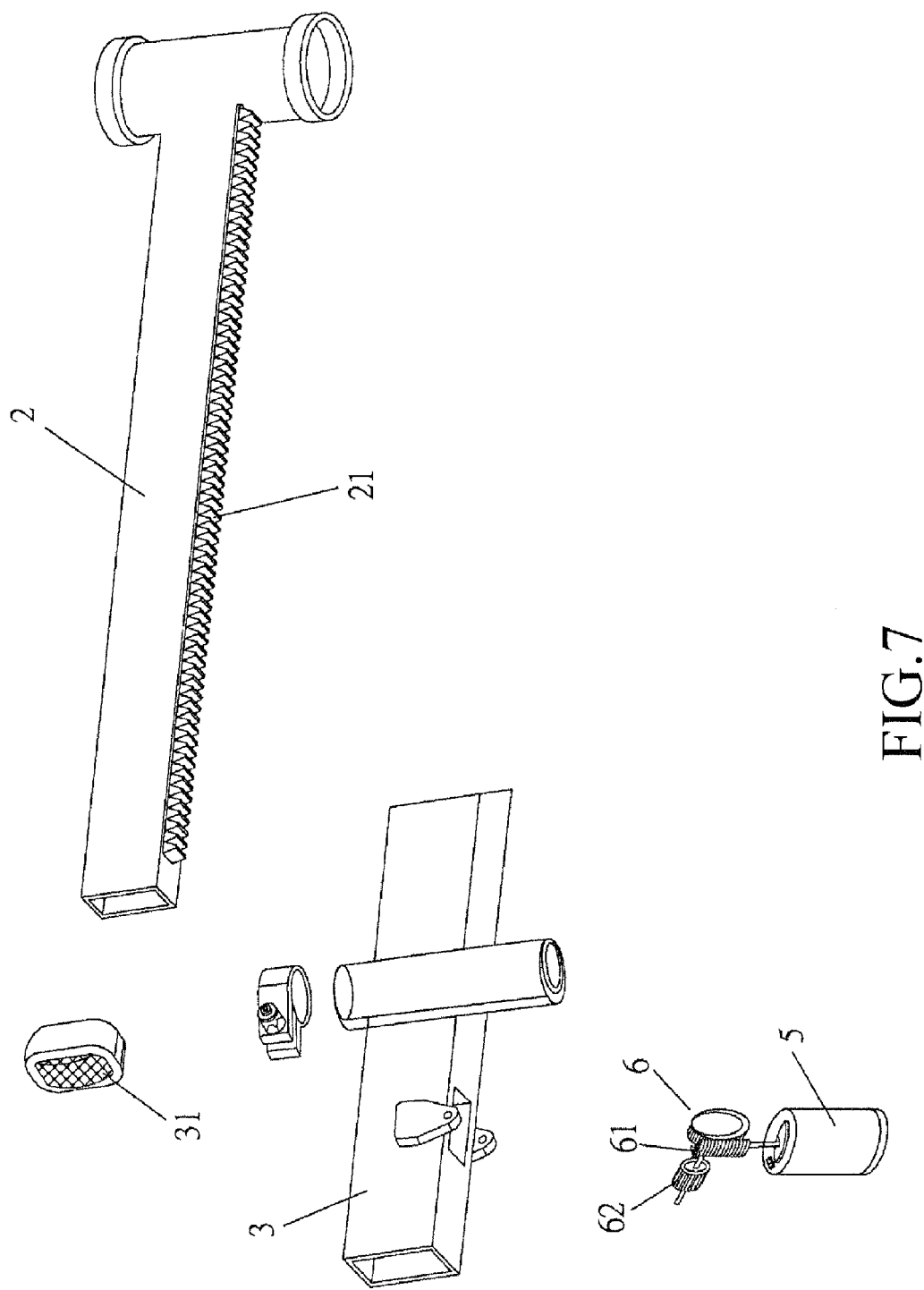
FIG. 7 is an exploded view of a portion of said another embodiment of the present invention
Figure 8:
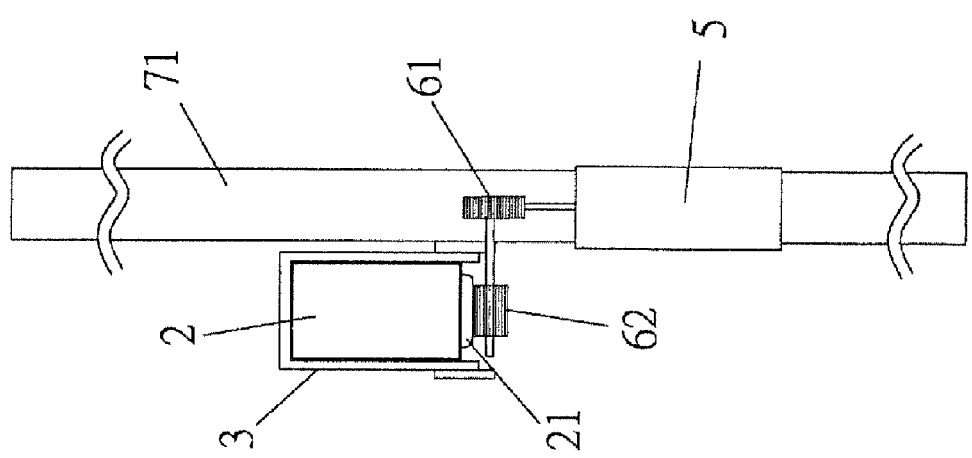
FIG. 8 is a cross-sectional view showing a shaft tube, a guide sleeve, and a driving element of said another embodiment of the present invention.

Referring to FIGS. 6-8, another embodiment of the present invention is shown, in which a single shaft tube 2 extends rearward from a head tube 11 that is mounted atop a front fork 1 and the shaft tube 2 extends through a guide sleeve 3. A closure member 31 is mounted to a rear end of the shaft tube 2. The guide sleeve 3 is arranged to abut against one side of a seat tube 71 that is arranged below and supports a seat 7. The shaft tube 2 has a bottom surface on which a rack 21 is formed. A motor 5 is set on a rear fork 4 of the bicycle. The motor 5 has a spindle that is coupled to a speed-reduction gear 61 of a transmission gear train 6. The speed-reduction gear 61 is connected to a pinion 62, which is arranged at a location corresponding to the shaft tube 2. The pinion 62 mates the rack 21 mounted to the bottom surface of the shaft tube 2.

Figure 9:
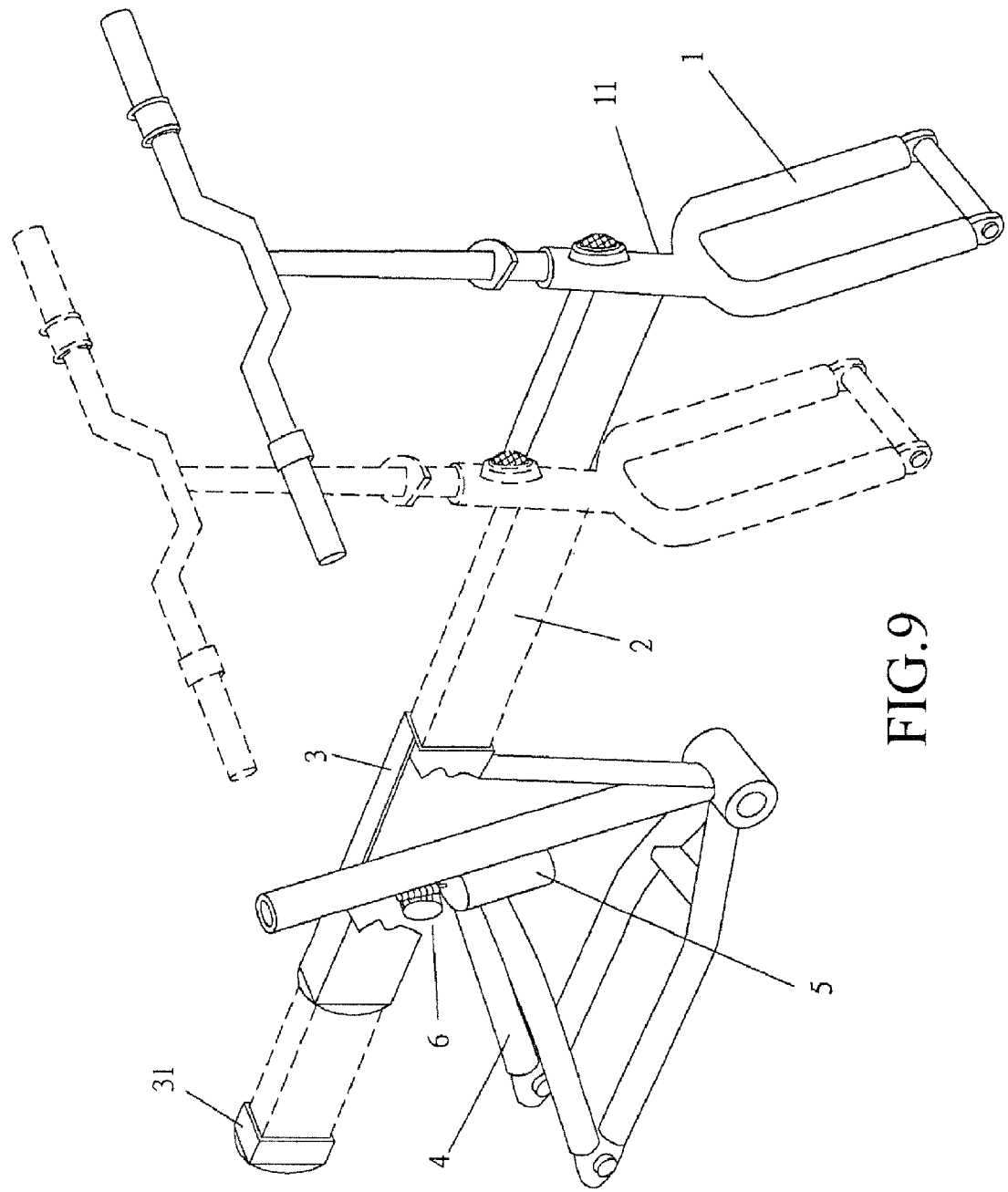
FIG. 9 is a perspective view showing the operation of said another embodiment of the present invention.

When a user wishes to reduce the length of the bicycle, the user activates the operation of the motor 5, and the speed-reduction of the transmission gear train 6 is caused to drive the rotation of the pinion 62. Since the pinion 62 mates the rack 21 on the bottom surface of the shaft tube 2, the transmission gear train 6 may operate to cause backward movement of the shaft tube 2 so as to retract the bicycle, as shown in FIG. 9, and thus reducing the length of the bicycle. To resume the original length, the operation of the motor 5 is activated again to cause rotation of the motor 5 in an opposite direction. The transmission gear train 6 then causes the shaft tubes 2 to move forward to resume to the original condition of the bicycle.

Figure 10:
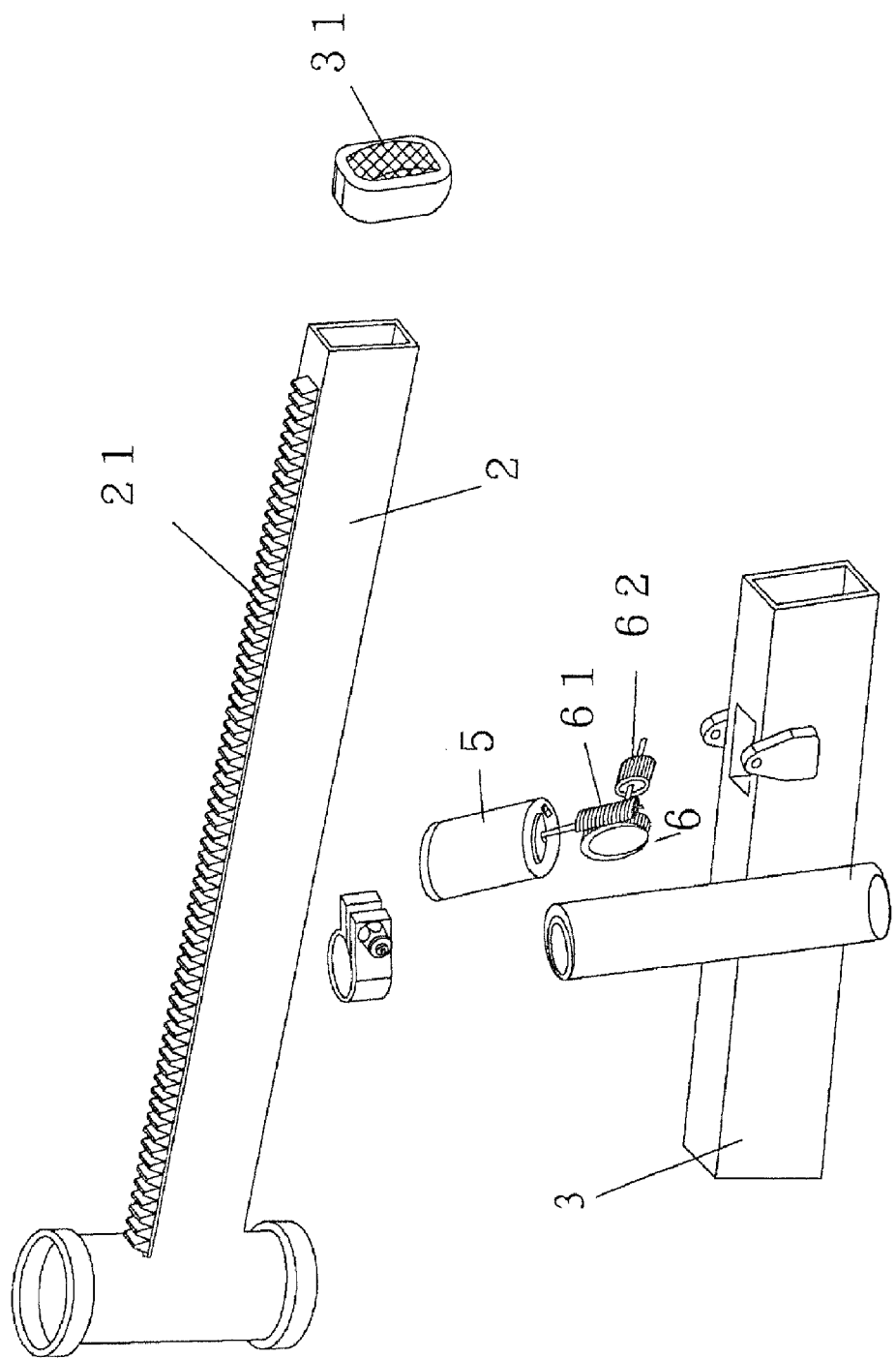
FIG. 10 is an exploded view illustrating an alternative arrangement of a rack in accordance with the present invention.
Figure 11:
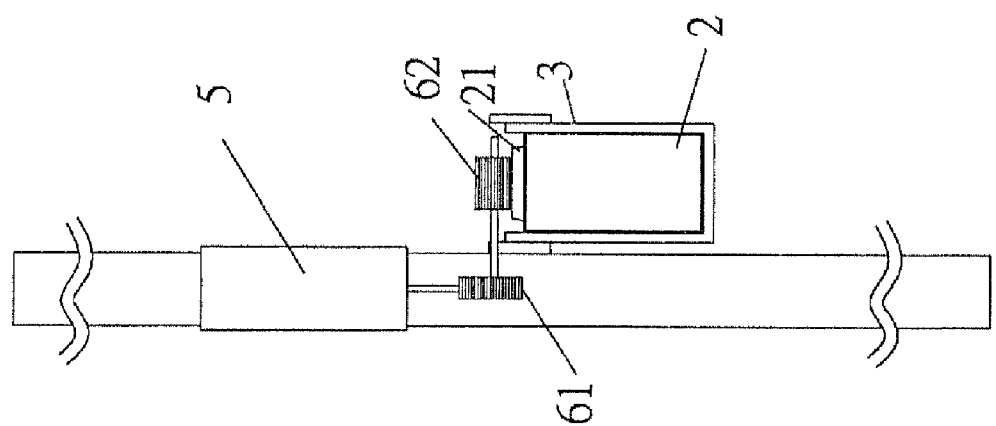
FIG. 11 is a cross-sectional view of FIG. 10.

Alternatively and as shown in FIGS. 10 and 11, the location where the rack 21 is set is not limited to the bottom of the shaft tube 2 and, instead, the rack 21 can be set on a top of the shaft tube 2 with the motor 5 and the transmission gear train 6 set at corresponding locations so that the motor 5 can still drive movement of the shaft tube 2 through the transmission gear train 6. It is also apparent that the rack 21 is set on a side surface of the shaft tube 2 and again, the operation of the motor 5 selectively drives forward and backward movements of the shaft tube 2 through the transmission gear train 6.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An electrically-extendible bicycle, comprising two shaft tubes, which are arranged symmetrically on opposite sides of a head tube that is set atop a front fork, the two shaft tubes extending through a guide sleeve, a closure member mounted to ends of the two shaft tubes, the shaft tubes having bottom surfaces on which racks are respectively formed, a motor being set on a rear fork and adapted to electrically connect to a power source, the motor having a spindle that is coupled to a transmission gear train, which mates the racks on the bottom surfaces of the two shaft tubes.

2. An electrically-extendible bicycle, comprising a shaft tube, which extends from a head tube that is set atop a front fork, the shaft tube extending through a guide sleeve, a closure member mounted to an end of the shaft tube, the guide sleeve being arranged to abut against one side of a seat tube that is arranged below a seat, the shaft tube having a bottom surface on which a rack is formed, a motor being set on a rear fork, the motor having a spindle that is coupled to a transmission gear train, which mates the rack on the bottom surface of the shaft tube.

3. The electrically-extendible bicycle according to claim 1, wherein the racks of the shaft tubes are alternatively set on tops or side surfaces of the shaft tubes.

4. The electrically-extendible bicycle according to claim 2, wherein the rack of the shaft tube is alternatively set on a top or a side surface of the shaft tube.

* * * * *